United States Patent

[11] 3,592,962

[72] Inventors Larry R. Matthews
Victor, N.Y.;
Bjorn Reiseter, Billerica, Mass.
[21] Appl. No. 621,890
[22] Filed Mar. 9, 1967
[45] Patented July 13, 1971
[73] Assignee Xerox Corporation
Rochester, N.Y.

[54] FACSIMILE COMMUNICATION CONTROL CIRCUIT
6 Claims, 7 Drawing Figs.

[52] U.S. Cl. .......... 178/5.6, 178/DIG. 23, 179/4
[51] Int. Cl. .......... H04h 7/14, H04n 1/32
[50] Field of Search .......... 178/6, 6.8, 6.6.7.1, 7.2, 7.6; 179/2 DP, 4, 15; 325/21, 22

[56] References Cited
UNITED STATES PATENTS
3,352,966 11/1967 Sawazaki et al. .......... 178/6

*Primary Examiner*—Robert L. Richardson
*Attorneys*—James J. Ralabate, Norman E. Schrader and Ronald Zibelli

ABSTRACT: A control system for controlling the operation of a voice and graphic information transceiver communication system. Logic circuitry is selectively enabled and disabled to allow for graphic operation of a transceiver in the transmit or receive mode.

PATENTED JUL 13 1971 3,592,962

INVENTORS
LARRY R. MATTHEWS
BJORN REISETER
BY Ronald Zibelli
ATTORNEY

INVENTORS
LARRY R. MATTHEWS
BJORN REISETER
BY Ronald Zibelli
ATTORNEY

INVENTORS
LARRY R. MATTHEWS
BJORN REISETER
BY Ronald Zibelli
ATTORNEY

INVENTORS
LARRY R. MATTHEWS
BJORN REISETER
BY Ronald Zibelli
ATTORNEY

INVENTORS
LARRY R. MATTHEWS
BJORN REISETER
BY Ronald Zibelli
ATTORNEY

INVENTORS
LARRY R. MATTHEWS
BJORN REISETER
BY Ronald Zibelli
ATTORNEY

FACSIMILE COMMUNICATION CONTROL CIRCUIT

BACKGROUND

In many aspects of business and government it is often desirable to rapidly and economically transmit graphic information as well as voice communications between one or more remote points and a central point. For example, in the business community it is often advantageous for a salesman to be able to efficiently and economically transmit orders to a central office for acceptance and/or fulfillment. Additionally, in the newspaper business it is often desirable for a reporter to be able to quickly and completely dispatch graphic information to the main office for processing. The use of 2-way radios and telephones, although extremely advantageous in obtaining rapid voice communications, have not offered a complete solution for the transmission of graphic information, for unaided, they are not able to transmit graphic information effectively.

In addition to the desirability of rapid and economic transmission of graphic and voice communications, it is often desirable in the government and the business world to transmit information in a secure manner. By employing cryptographic techniques, the sender and receiver are assured that the information will not be intercepted by unauthorized personnel. By employing secure or cryptographic techniques the contents of a message to be transmitted over normal channels may remain a secret and not fall into unauthorized hands.

Facsimile systems are well known in the art in which a transmitter converts information on a document through, for example, an electro-optical scanning system into electrical signals suitable for transmission over wire or radio communication networks. At the facsimile receiver, the electrical signals in conjunction with suitable synchronizing signals control the marking apparatus in which response to received electrical signals recreates a copy or facsimile of the original document.

Similarly, secure telephone communication lines are well known particularly in government circles in which the voice or audio signals are encrypted or scrambled prior to their transmission over normal phone channels and decrypted or unscrambled at the receiving end. In this manner a secure voice system may be employed by scrambling or encrypting the message before transmission over the voice channel, and a similar decoding at the receiving station. In this manner the audio or voice signals are altered sufficiently prior to transmission to preclude unauthorized interception while the authorized or properly equipped receiver hears in real time the communication to be sent.

With the advent of mass communication networks, including vast globe encircling satellites and transoceanic cable telephone networks, it is possible to establish telephone communication circuits between nearly any two cities in the world. Thus, when employing either a secure telephone apparatus or a facsimile apparatus of the type hereinbefore described, it is possible to establish communications between nearly any two cities in the world. While it is possible to operate such secure telephone networks and facsimile systems independent over parallel channels, it is often desirable to transmit a combination of voice and graphic communications over a single channel. Further, it is desirable to selectively connect either a secure phone or a secure facsimile system over a single channel at the operator's command. Such a system is disclosed and claimed in copending application Ser. No. 572,596, filed Aug. 15, 1966, now U.S. Pat. No. 3,507,980 and assigned to the same assignee as the present application.

OBJECTS

It is, accordingly, an object of the present invention to provide improved control apparatus for selectively operating a transceiver system in either a voice or graphic mode.

It is another object of the present invention to provide improved logic circuitry which is selectively enabled and disabled to allow for graphic operation in a single transceiver unit in the transmit or receive mode.

BRIEF SUMMARY OF THE INVENTION

In accomplishing the above and other desirable aspects, applicants have invented improved apparatus for selectively controlling the operation of a voice and graphic transceiver communication system. In conjunction with predetermined enabling signals, specific portions of the logic circuitry are enabled in the transmit or receive mode and disabled accordingly. In this manner then the transceiver is selectively operated by such enabling signals to place the transceiver in the transmit or receive mode respectively.

DESCRIPTION OF THE DRAWINGS

For a more complete understanding of applicant's invention reference may be had to the following detailed description in conjunction with the drawings in which:

Referring now to FIG. 1 there is shown a system block diagram of a voice-graphic secure communications system according to the principles of the present invention.

Figure 1:
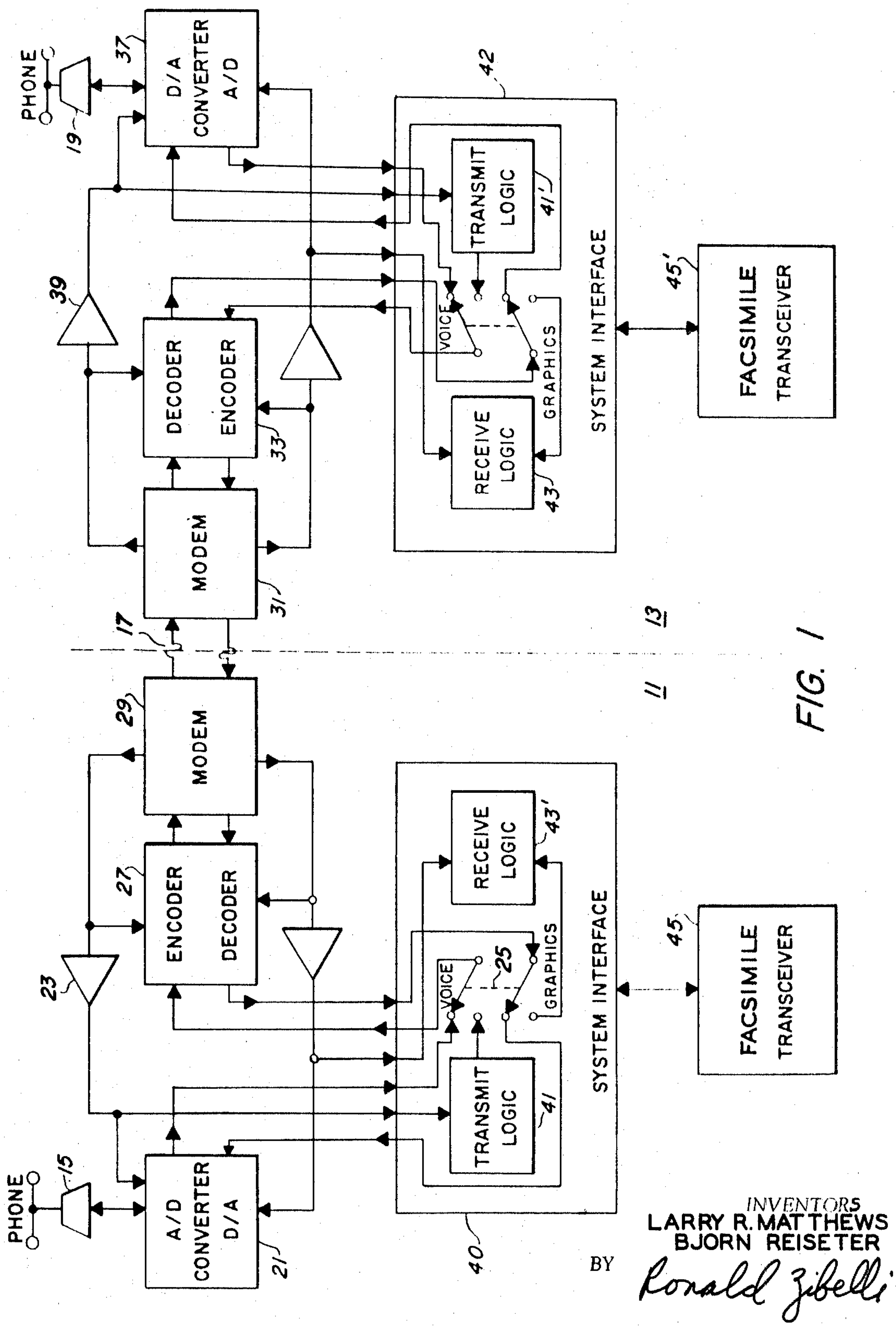
FIG. 1 is a block diagram of a combined voice and graphic communication network in accordance with the principles of the present invention.

While the system is described in conjunction with a secure telephone link obviously any number of communications links including normal telephone circuits are also utilizable. Whether the system is simplex or duplex will depend upon the communication link capabilities and the associated terminal apparatus.

Referring first to the voice mode, the respective parties at the transmitting and receiving stations 11 and 13 establish voice connections in the normal manner. Thus after dialing the appropriate exchange and unit digits the transmitting telephone 15 is coupled via appropriate switching apparatus which forms a portion of the overall communication link 17 to the receiving telephone 19. In this secure system the normal electrical signals generated in response to the sound waves transduced in the mouthpiece of the telephone 15 are coupled to the input of converter 21. In converter 21, which may comprise an analog to digital converter, the signals are amplitude quantized. Additionally the signals after being amplitude quantized are time quantized in accordance with the clock signals coupled via the isolation amplifier 23 to an input of converter 21. The output from converter 21 which now comprises an amplitude and time quantized signal corresponding to the analog voice signals is coupled via switch 25, in the position shown, to the input of the encoder circuit 27. The encrypter or encoding apparatus 27 may comprise any known means for mono or polyalphabetic substitution whereby groups of the normal binary signals generated in response to the instantaneous input to the analog converter 21 are converted in some predetermined cyclic order through various character patterns. The operation of the encrypter or scrambler 27 is controlled by clock signals generated or supplied by modem 29 at the transmitter terminal. After appropriate encryption in the encoder 27 the output signals are coupled via modem 29 to the input of the transmission line 17. The modem may comprise any appropriate terminal apparatus in which the signals are coupled to the input of the communication link after appropriate modifications in the signal frequency or power spectrum. In a typical apparatus the modem would convert the encrypted signal for transmission at a rate in the order of 2,400 baud over a standard telephone channel.

At the receiving terminal or end of the communication link the signals are similarly applied to modem 31 which reconverts the signals from the format of the transmitted signal to the signal format similar to that applied to the modem input at the transmitter end. The output of the modem 31 is coupled to the input of the decrypting or decoding circuit 33 in which the reverse of the encoding operation performed at the transmitter is performed. Thus, in a mono or polyalphabetic substitution encryption scheme, the received character would be decrypted by successive permutations in the reverse order of a similar code cycle. The operation of the decoder 33 is controlled in a manner similar to that of the transmitter by the clock supplied by the receiver modem 31. The output of the decrypter 33 is coupled via the switch 35 in the voice mode, as shown, to the input of converter or restorer circuit 37. Converter circuit 37 may comprise a digital-analog converter in which in the receiving mode an analog signal similar to that generated by the transducer of the mouthpiece of the telephone in response to the sound or voice signals to be transmitted over secure telephone system is generated. The output of the deconverter 37 is controlled by the clock coupled via amplifier 39 from the modem 31. The signal from the deconverter 37 is coupled to the ear piece of the receiver telephone and there transduced to audio signals in the normal manner.

In accordance with one aspect of the present invention the secure system employed for the encryption and decryption of the normal voice mode is similarly employed to encrypt and decrypt facsimile signals to be transmitted over the channel. Multiposition switches 25 and 35 are employed at the respective transmit receive terminals for operator control of the mode selection. As shown in FIG. 1 switches 25 and 35 are in the voice mode. In the graphics mode the operators at the respective stations selectively position the switches in the graphics position thereby readying the apparatus for the graphics mode. As will hereinafter be more fully described, a loop check procedure is initiated upon the operation selection of the graphics mode to prevent the inadvertent sending of graphic material. In the graphic mode video signals from a facsimile transmitter generated in response to the scanning of a document for example by electro-optical scanning apparatus are coupled to the transmit logic 41 and thence via switch 25 to the input terminal of encoding apparatus 27. As in the voice mode the graphic data coupled to the input of encoder 27 is modified in accordance with a predetermined encoding rule and coupled to the input of modem 29. In the modem the encrypted signals are modified for compatibility with the transmission media and thence coupled to the input of the transmission channel. At the output of the transmission channel the signals are received by modem 31 and coupled to the input of decoder 33. As in the voice mode, the received data is coupled via the appropriate switch section of switch 35 to the input of receive logic 43 of the interface apparatus 42. In the receive logic 43 appropriate signals are generated to control the operation of facsimile transceiver 45 wherein a facsimile of the original document being transmitted is recreated at the receiving terminal.

Figure 2:
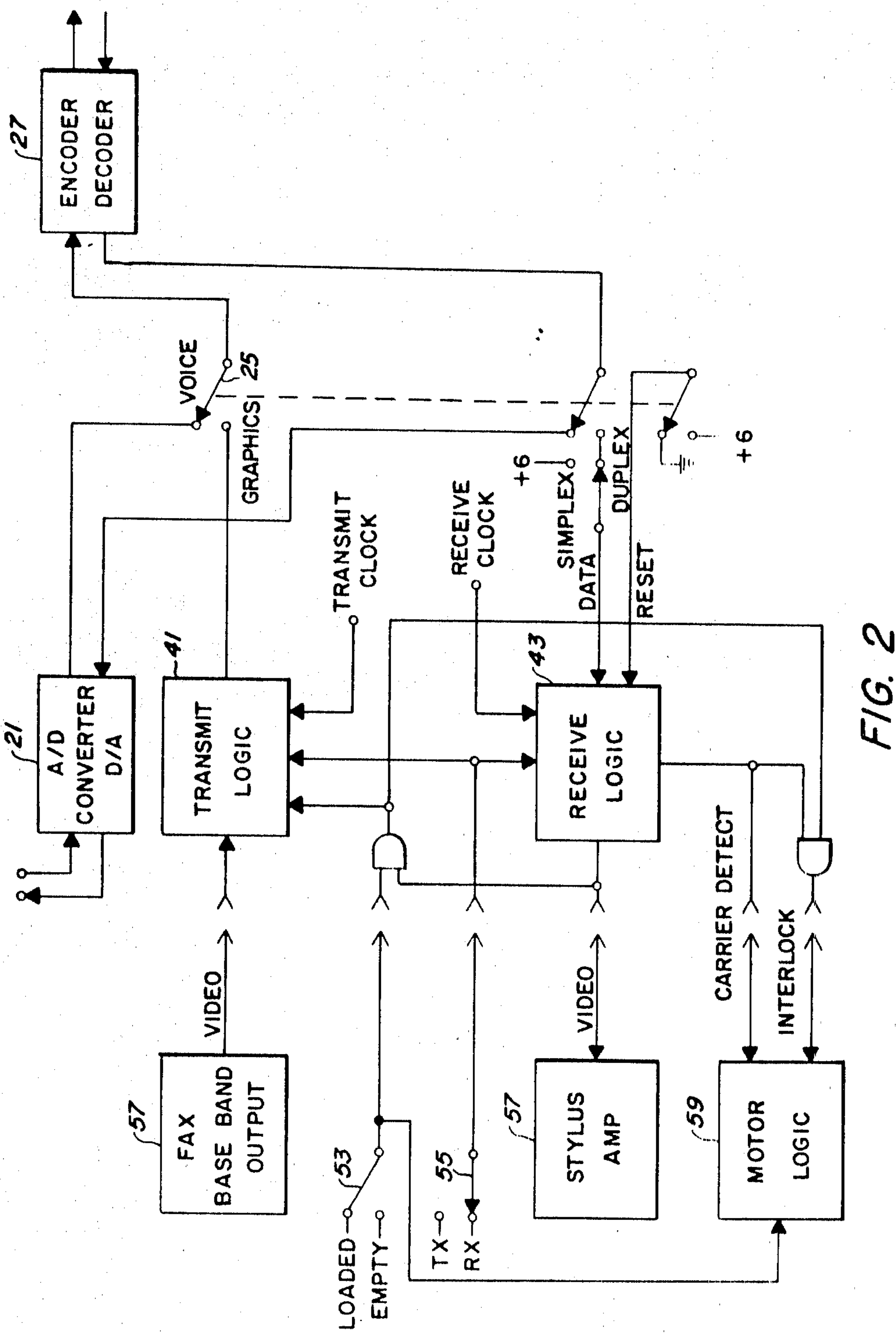
FIG. 2 is a logical block diagram of one terminal of the switching apparatus in accordance with the principles of the present invention.

Referring now to FIG. 2 there is shown a block diagram of one terminal of a secure dual mode communications link in accordance with the principles of the present invention. As shown the audio signals from a transmitting telephone handset are coupled to the input of converter 21 and the output of the converter with the switch 25 in the position shown is coupled to the encoder 27. Similarly, in the receiving mode the decrypted signals are coupled from the output of the decrypting portion of the secure apparatus 27 via the switch 25 in the positions shown to the input of the converter 21. In the receiving mode the converter would act as a deconverter thus generating appropriate signals for driving the speaker in the earpiece of the receiving telephone. As will hereinafter be more fully explained in the transmit mode, a loop check procedure insures that the respective facsimile transmitter and receiver are in the graphic mode. As shown a paper load switch 53 and a request to send-receive switch 55 must be properly positioned at the respective transmitter and receiver stations to enable the transmit and receive logic. With the graphic loop check procedure completed the transmit logic 41 is enabled to couple the video signal stream via the record or graphic section of the select switch 25 to the input of the encoder 27. Thereafter in the manner hereinbefore described the information signals are scrambled prior to coupling to the transmit end of the communication link and thereafter the decoded signals are coupled at the receiver to control the operation of the facsimile recorder.

While any facsimile apparatus may be adapted to perform in the combined secure voice-graphics mode in accordance with the principles of the present invention, the preferred embodiment of the interface control logic will be described in conjunction with signals generated by a Xerox-Magnavox Telecopier transceiver which is commercially marketed by Xerox Corporation. The terminal shown at FIG. 2 may function either as a transmitter or receiver with the Telecopier transceiver as the facsimile or graphic communication apparatus.

In the receive graphic mode, the data stream coupled after decryption or decoding from the decoding circuit 27 is applied via switch 25 to the input of the receiver logic 43. Similarly in the transmit graphic mode the video signals from video output 57 are coupled to the transmit logic 41. Initially a stop tone signal pattern is generated and transmitted. At the receiver station this signal pattern initiates a loop check procedure which conditions both the transmitter and receiver to function in the graphic mode. As will hereinafter be more fully described this involves the generation of appropriate signals to indicate that the system is prepared for the graphic mode and the generation of appropriate logical signals for controlling the selective actuation of the facsimile transceiver in the receiving mode. In the receiver logic the respective video, synchronizing and stop tone signals are separately employed to actuate the stylus, to establish synchronism and to generate appropriate control signal levels which are coupled to the motor control logic respectively. Similarly, the paper load and request to send control signals control the activation of the transmit logic 41. The video stream out of the receiver logic is coupled in the case of the Telecopier facsimile apparatus to the stylus amplifier 57. As is known the stylus amplifier may comprise a driver which varies a marking stylus pressure against a record sheet in accordance with the received video pulse train. The received video may comprise either a two level black-white system or in normal operation a plurality of signal levels corresponding to the grey scale capabilities of the apparatus. As shown the respective paper load switch 53 and the request to send-receive switch 55 must initially be properly positioned at the receiver to initiate the graphic mode of transmission. With the hereinbefore described loop check procedure complete, the video from the receive logic is coupled to the stylus amplifier and the record medium is controlled by the motor control logic 59. Thus the video signals control the selective actuation of the stylus thereby recreating or generating a facsimile copy of the transmitted document at the receiver.

Figure 3:
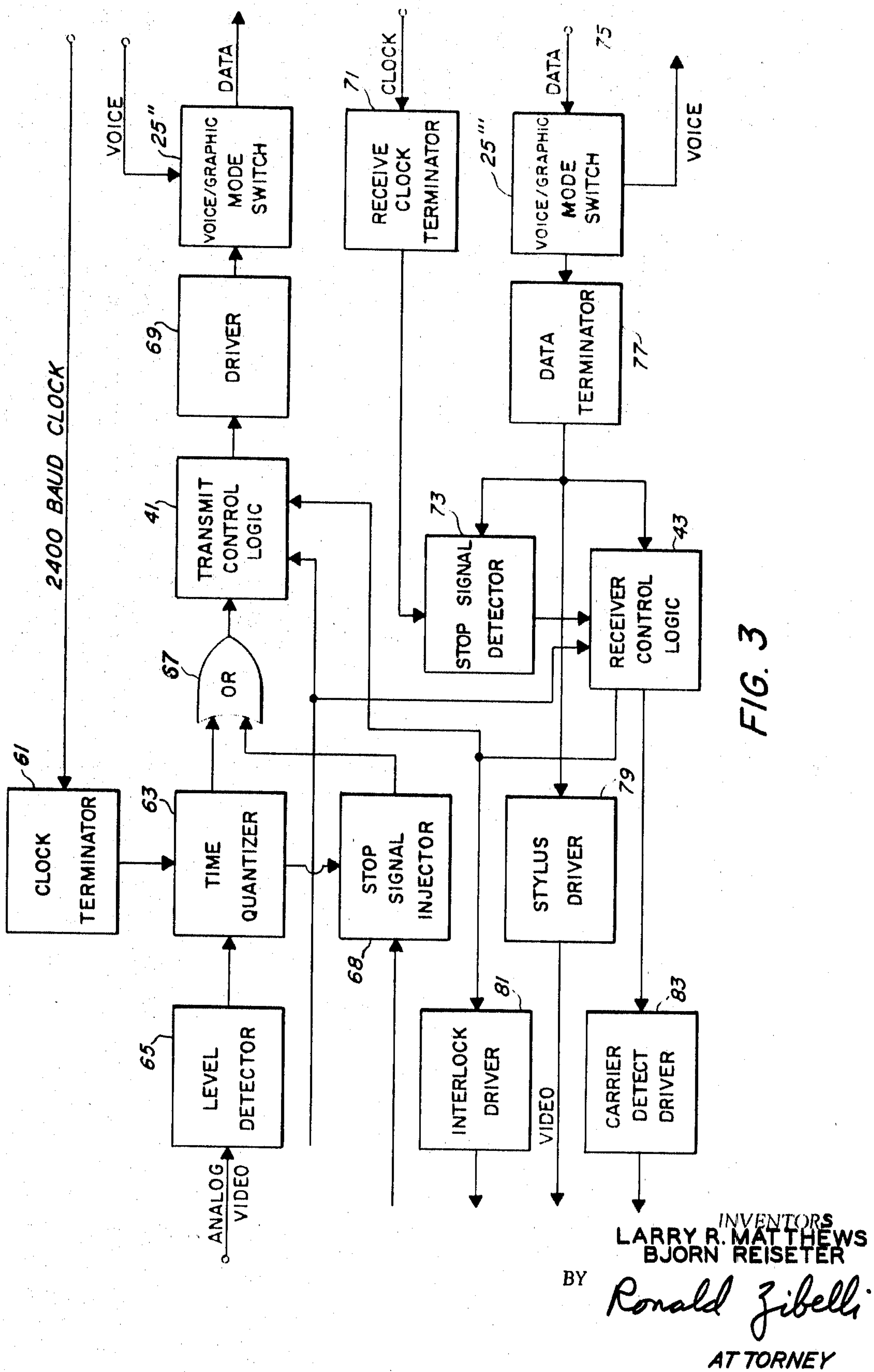
FIG. 3 is a block diagram illustrating further aspects and details of a facsimile phone interface terminal apparatus embodying the principles of the present invention.

Referring now to FIG. 3 there is shown a block diagram of the interface logic for the combined graphic-phone interface apparatus in accordance with the principles of the present invention. As hereinbefore described in conjunction with FIG. 1 the clock signal is supplied by the modems 29 and 31 at the transmitter and receiver terminal respectively. This clock signal which for example may comprise a 2,400 hertz square wave, is coupled to clock terminator and phase control apparatus 61. The clock terminator circuit includes appropriate electronic circuitry for example a transistorized amplifier stage, for shifting the logic or signal level from that of the modem unit to that compatible with the interface logic. The clock signal is coupled from the output of the clock terminator 61 to the input of the quantizer circuit 63 wherein the video signal train is time quantized, i.e., the transitions are limited to predetermined times.

In the case of the operation of the Telecopier facsimile apparatus in the two level mode, the analog signal from the transmitter video circuit of the transceiver is coupled to the input of level detector 65 wherein the two level video signal is generated by adjusting an appropriate slicing level to convert the respective analog signal excursions into black and white levels respectively. The two level video signal is coupled to the input of the quantizer circuit 63 wherein the transitions are restricted to predetermined clock times thereby resulting in a synchronous video signal train. The output of the synchronous video train is coupled to one input of OR gate 67. The other input to OR gate 67 is generated by the stop signal injector 68 (FIG. 6) which is controlled by the paper load switch. OR gate 67 couples either the quantized video train or the stop signal to the input of transmit control logic 41. Under the control of the request to send-receive switch and the paper load switch the transmit logic couples either the video signal or the stop tone signal to the encrypting apparatus via the driver 69 and voice-graphic mode switch 25 which may comprise a transistorized switching apparatus. Thereafter the video or stop tone signals are encrypted and coupled to the receiving terminal in the manner hereinbefore described.

In the receiving mode the clock terminator and phase control 72 couples a receiver clock from the modem to the stop signal detector and timer 73. The data from the decrypting circuit at the receiver is coupled from terminal 75 to the voice-graphic mode switch 25. The output of the data terminator 77, which may comprise a transistorized amplifier for converting the logic levels to insure compatibility between the respective modem and the interface logic, couples the received data stream in the graphic mode to the input of the receiver control logic 43, and the stop signal detector and timer 73. As will hereinafter be more fully explained the stop signal detector 73 monitors the data stream in the graphic mode to detect the stop signal pattern. The detection of the stop signal initially conditions the receiver logic in the receive mode. The receive logic couples the appropriate logic signals to the input of the interlock driver logic 81 and the carrier detect logic circuit 83 for controlling the facsimile apparatus. The data from the data terminator 77 is likewise coupled to the input of the stylus driver 79 which as hereinbefore described controls the selective actuation of the facsimile printer thereby generating a facsimile copy of the transmitted document.

In the two level black-white facsimile mode the stop tone signal preferably comprises an alternating pattern of binary "ones" and "zeros" at a predetermined rate. In the case of a 2,400 hertz square wave clock signal, the stop signal preferably comprises a 1,200 hertz repetitive binary "one-zero" pattern. The stop tone detector 73 and stop signal injector 68 of the transmitter and receiver will be hereinafter described in further detail.

Figure 4:
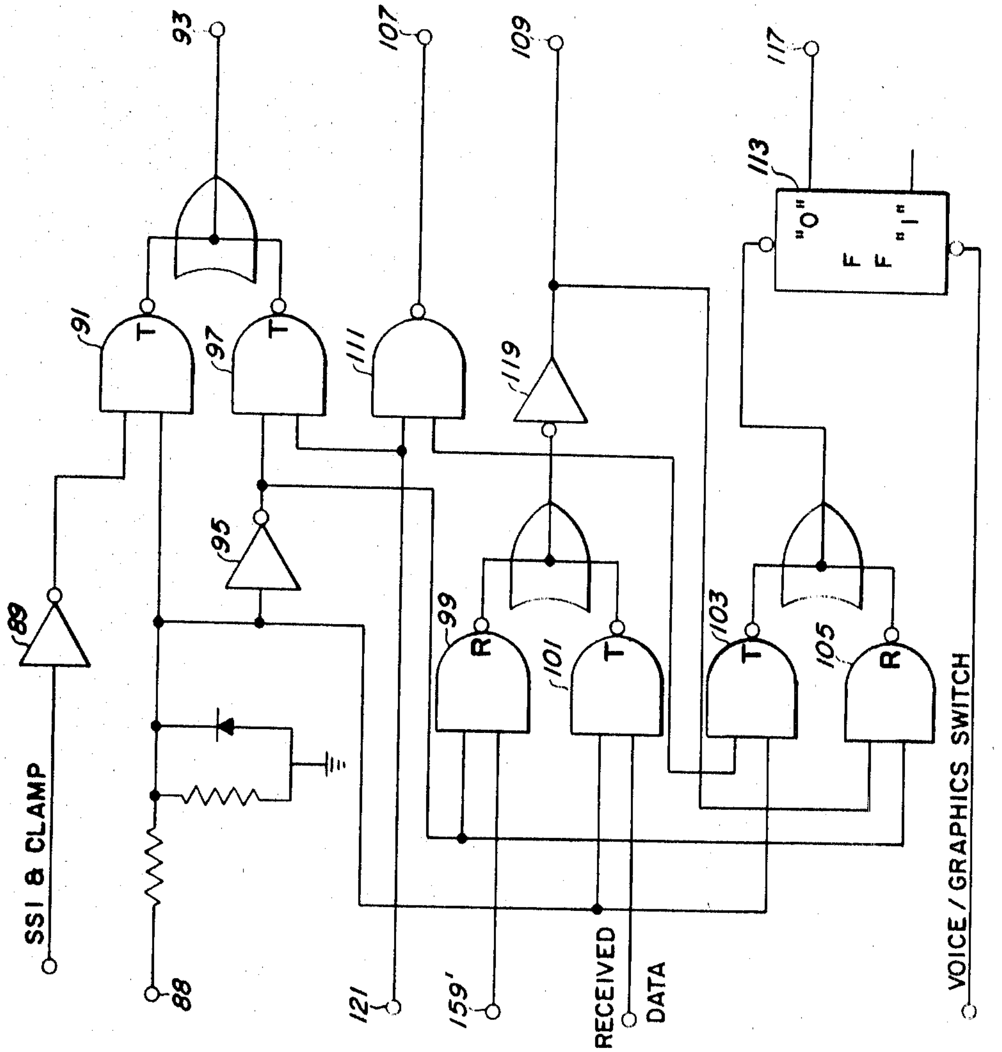
FIG. 4 is a logical diagram of the transmit-receive interface control logic embodying the principles of the present invention.

Referring now to FIG. 4 there is shown a logical diagram of the transmit-receive logic for controlling the operation of the facsimile apparatus in the combined phone-graphic communication link. As hereinbefore stated, while any facsimile apparatus may be utilized in accordance with the principles of the present invention, the preferred embodiment utilizes a Xerox Magnavox Telecopier transceiver at the respective terminals of the combined link. While the particular logic control signals, utilized to control the transceiver in the graphic mode, depend upon the particular facsimile apparatus employed, it will be recognized by those skilled in the art that considerable modifications may be made to the illustrative control logic and signals disclosed in conjunction with the preferred embodiment to accomplish equivalent control functions, depending upon the requirements of the facsimile apparatus.

In the logical diagram illustrated in FIG. 4, and the other drawings the various logical elements AND, OR and NOT, may be of any type known in the art for accomplishing the respective logical operations. It should be noted that in the preferred embodiment the AND gates connected as shown with the outputs strapped, i.e., two respective AND gate outputs tied together, accomplishes the equivalent of the logical OR function and thus a phantom or symbolic OR gate is shown at the junction of the AND gate outputs of the respective AND gate pairs.

Similarly, the flip-flop or storage elements functionally may be accomplished by any bistable device, for example, the ordinary cross-coupled Eccles-Jordan circuit having separate inputs and outputs. For simplicity of comparison of the control logic illustrated in FIG. 4 with that shown in the various figures the appropriate designation T and R has been added to the respective logical gating elements which are employed primarily in the transmit (T) and receive (R) mode respectively, while those undesignated logical elements function in both the transmit and received mode.

The video signals generated and shaped in accordance with the hereinbefore described method are coupled via inverter 89 to one input of transmit AND gate 91. The other input to transmit AND gate 91 is coupled to the request to transmit-receive switch and clamping network. Thus, with the loop in the graphic mode and the request transmit-receive switch in the appropriate condition, AND gate 91 is conditionally enabled thereby permitting the video signals coupled to the other input of the AND gate to be generated at the output thereof. The output signals from AND gate 91 are coupled from terminal 93 to the data driver and via the voice-graphic switch to the encoding circuit. With the request to transmit-receive switch in the transmit position, the logical level coupled via inverter 95 to receive AND gate 97 is logically false, thus disabling, receive AND gate 97. Similarly, the signal from the transmit-receive switch is coupled to one of the respective inputs of AND gates 99, 101, 103 and 105, thereby controlling the operation thereof. In this manner with the transmit-receive switch in the transmit position, the gates 101 and 103 which operate in the transmit mode are enabled, thereby generating the appropriate logical control signals at terminals 107 and 109 for controlling the interlock and carrier detect circuits of the facsimile transceiver and terminal 117 for controlling the stop tone injector circuit. Similarly gates 97,99 and 105, the receive sections, are enabled or disabled depending upon the position of the transmit-receive switch to generate appropriate logic level at terminal 117 to control the operation of the stop tone injector circuit 68 of FIG. 3 and logic levels at terminals 93, 107 and 109, respectively.

With the transmit-receive switch in the receive position the logic level which is coupled to terminal 88 at the receive level, the respective transmit AND gates (T) are disabled while the corresponding receive logic gates (R) are enabled. With the receive gates (R) enabled, the timer signal coupled to the input of AND gate 99 energizes gate 99 and a level signal is coupled via inverter 119 to an output terminal 109. This signal as shown in FIG. 3 corresponds to the carrier detect signal control level and is used to control the operation of the facsimile transceiver in the receive mode. Similarly, when the AND gate 111 is enabled, by the clamp level coupled to terminal 121 and the output of AND gate 99, a logical signal level at terminal 107 corresponds to the interlock signal. In the receive mode receive gate 97 is enabled by the signal coupled to the input via inverter 95, clamp signal from terminal 121 permits the generation at terminal 93 of the reverse supervisory logical level for shifting the level on the transmission line during legitimate graphic mode operation. Thus, with the appropriate facsimile transceiver control signals generated by the control logic, the signals coupled to the stylus amplifier (FIG. 3) in response to the reception of data, the facsimile copy is generated corresponding to the received video signals.

Figure 5:
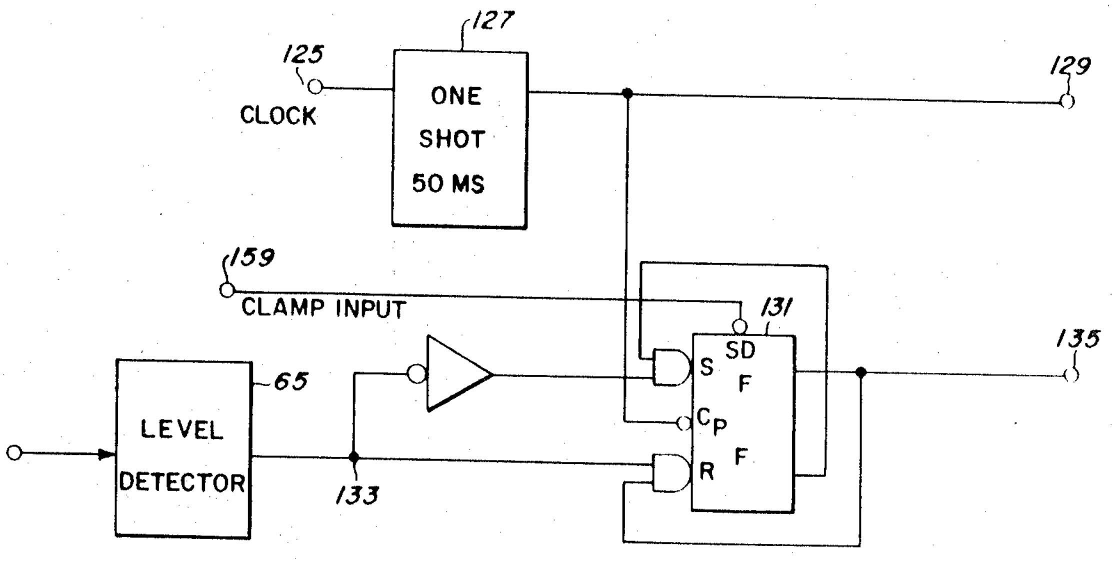
FIG. 5 is a block diagram of video quantizer circuitry utilizable in accordance with the principles of the present invention.

Referring now to FIG. 5, there is shown a logical diagram of a quantizer circuit 63 utilizable in the interface apparatus of FIG. 3 in accordance with the principles of the present invention. As hereinbefore described, the video signal generated by the facsimile transmitter, in the preferred embodiment corresponds to a multilevel analog signal corresponding to the various gray scale levels of background and information on a document along a predetermined scanning raster. In the two-level operation of the secure voice-graphic communication system in the graphic mode a two-level amplitude and time quantized video signal is generated corresponding to a predetermined slicing level to generate or denominate black and while levels corresponding to the information and background levels of the document being transmitted respectively. Functionally, the quantizer generates an amplitude and time quantized video wave train corresponding to the portions of the analog signal which are above and below any threshold respectively.

As shown in FIG. 5, the clock signal is coupled via the input terminal 125 to a one-shot multivibrator 127 which shortens the clock pulse times. These shortened pulses corresponding to the transitions in the normal clock are coupled from terminal 129 to the stop signal injector (FIG. 6) and to the toggle input of flip-flop 131. The video signal is coupled from the level detector 65 to the respective AND gate inputs of flip-flop 131 in the inverted and noninverted form respectively. The other inputs to the flip-flop AND gates are taken from their respective logical "one" and "zero" outputs. In this configuration flip-flop 131 which may comprise a pair of parallel driven alternately active flip-flop circuits in which one of the respective outputs is shown, is conditioned to favor change. That is, the flip-flop 131 is encouraged by the feedback to assume a state different from one state if the analog signal has changed during the preceding clock time.

The output from terminal 135 of the quantizer circuit flip-flop 131 comprises the amplitude and time quantized video signal train, which in the preferred embodiment comprises a 2,400 baud video train. As hereinbefore described, the video train is coupled via the voice-graphic switch (FIG. 1) to the input of the encoder circuit and thence to the input of the transmission medium.

Figure 6:
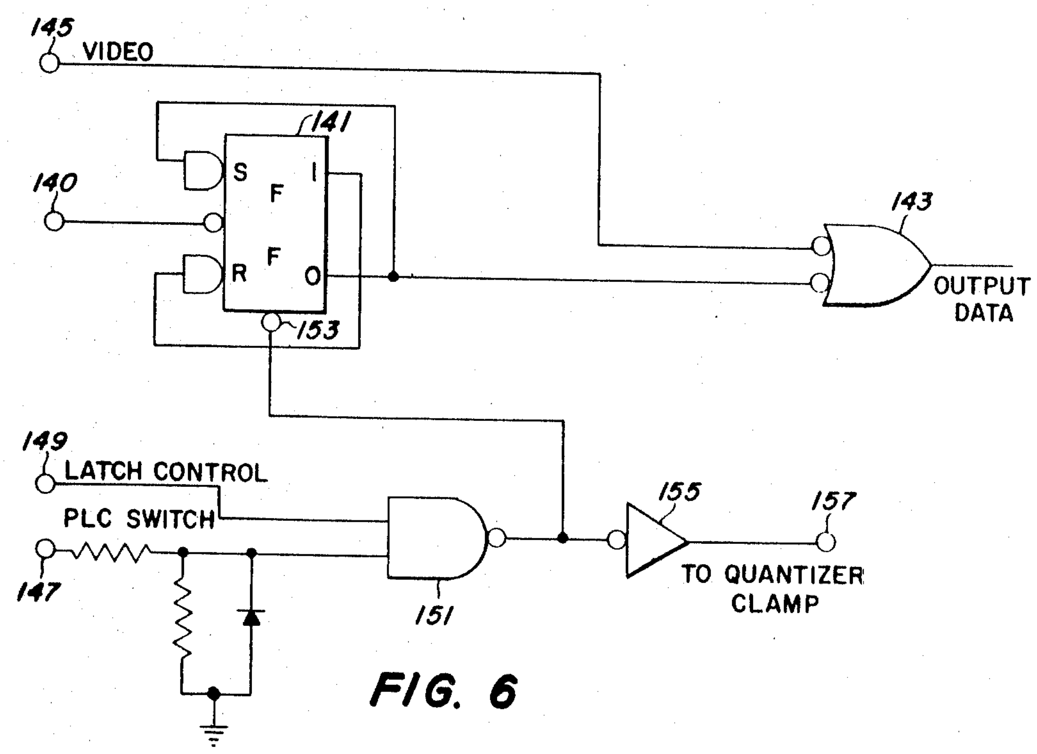
FIG. 6 is a block diagram of the stop signal injector circuit utilizable in accordance with the principles of the present invention.

Referring now to FIG. 6, there is shown a logical diagram of the stop signal injector and clamping circuit utilizable in the interface apparatus of FIG. 3 in accordance with the principles of the present invention. As was hereinbefore described, the loop check procedure precedes the initiation of the graphic mode transmission. In the loop check procedure the transmitter sends a stop tone, i.e., a unique signaling pattern to the receiver, when either no data is being transmitted or when the reverse supervisory graphic signaling signal is lost. As hereinbefore described, to insure proper transmission of graphic information, it is desirable in accordance with one aspect of the present invention to provide a reverse graphic mode signal which may comprise a DC level shift in transmission media, which is appropriately detected at the transmitter and interpreted as meaning that the loop is in proper condition for the graphic transmission mode. When the transmitter and receiver are properly prepared for graphic transmission, i.e., when the paper load switch and transmit-receive switches are in the proper position, the receiver generates a clear-to-send signal which as hereinbefore described, may comprise a DC level shift, i.e., at terminal 93 of FIG. 4 for coupling to the transmission media. Upon receipt of the reverse supervisory clear-to-send signal, the stop tone injector is inhibited at the transmitter by the receive logic and the facsimile unit goes into the normal transmit graphic mode.

While the respective clear-to-send signal and stop tone signals may comprise any signaling pattern which may be generated and detected at the respective transmitting and receiving terminals, in accordance with the preferred embodiment of the present invention the stop tone comprises a 2,400 baud, 1,200 hertz, alternating pattern of binary "ones" and "zeros" and the reverse supervisory clear-to-send signal is a DC level shift. This preferred embodiment of the stop tone is for the preferred embodiment of the combined voice-graphics link wherein the information is normally transmitted at a 2,400 baud rate.

Referring now to FIG. 6, there is shown the preferred embodiment of the stop signal injector and clamping circuit. The clock from the quantizer circuit (FIG. 5) is coupled to the toggle input of the flip-flop 141 via terminal 140. The logical control gates associated with the respective halves of the flip-flop 141 are cross-coupled from the output, thus, arranging the flip-flop in an essentially center-driven toggle configuration. The output of the flip-flop is coupled to one input of OR gate 143, which selectively couples either the stop tone signal from flip-flop 141 or the quantized video signals coupled from terminal 145 to the output data path comprising the control logic and voice-graphics switch as set forth hereinabove. The control of the generation of the stop tone as hereinbefore described depends upon the proper positioning of the paper load switch which couples a suitable signal to terminal 147 and the control logic latch level coupled to terminal 149. The respective control signals are coupled to the input of AND gate 151 which generates a control signal for an override terminal 153 of flip-flop 141. As will hereinafter be more fully described, the override signal coupled to override terminal 153 inhibits the flip-flop action and locks the flip-flop 141 in the "zero" state, thus allowing video from terminal 145 to be coupled via the OR gate 143 to the output data stream. The output of AND gate 151, which controls the operation of the stop signal generating flip-flop 141 is also coupled via inverter 155 to terminal 157. This inverted output of AND gate 155 is coupled to the clamp input terminal 121 of FIG. 4 and the clamp input terminal 159 of FIG. 5 respectively.

The clamp signal coupled to the clamp terminal 121 of FIG. 4 controls the generation of control signal levels at terminals 107 and 93, which respectively control the interlock circuitry in the transceiver and the operation of the transmit logic (FIG. 3). Thus, when the stop tone is detected in the receiver, gate 99 under the control of the stop tone detector signal coupled to terminal 159 generates appropriate signals for inhibiting the operation of the receiver and enabling the operation of the transmit logic. Similarly, in the quantizer (FIG. 5) the clamp input signal overrides the video and the clock signals to inhibit the operation of video flip-flop 131.

Figure 7:
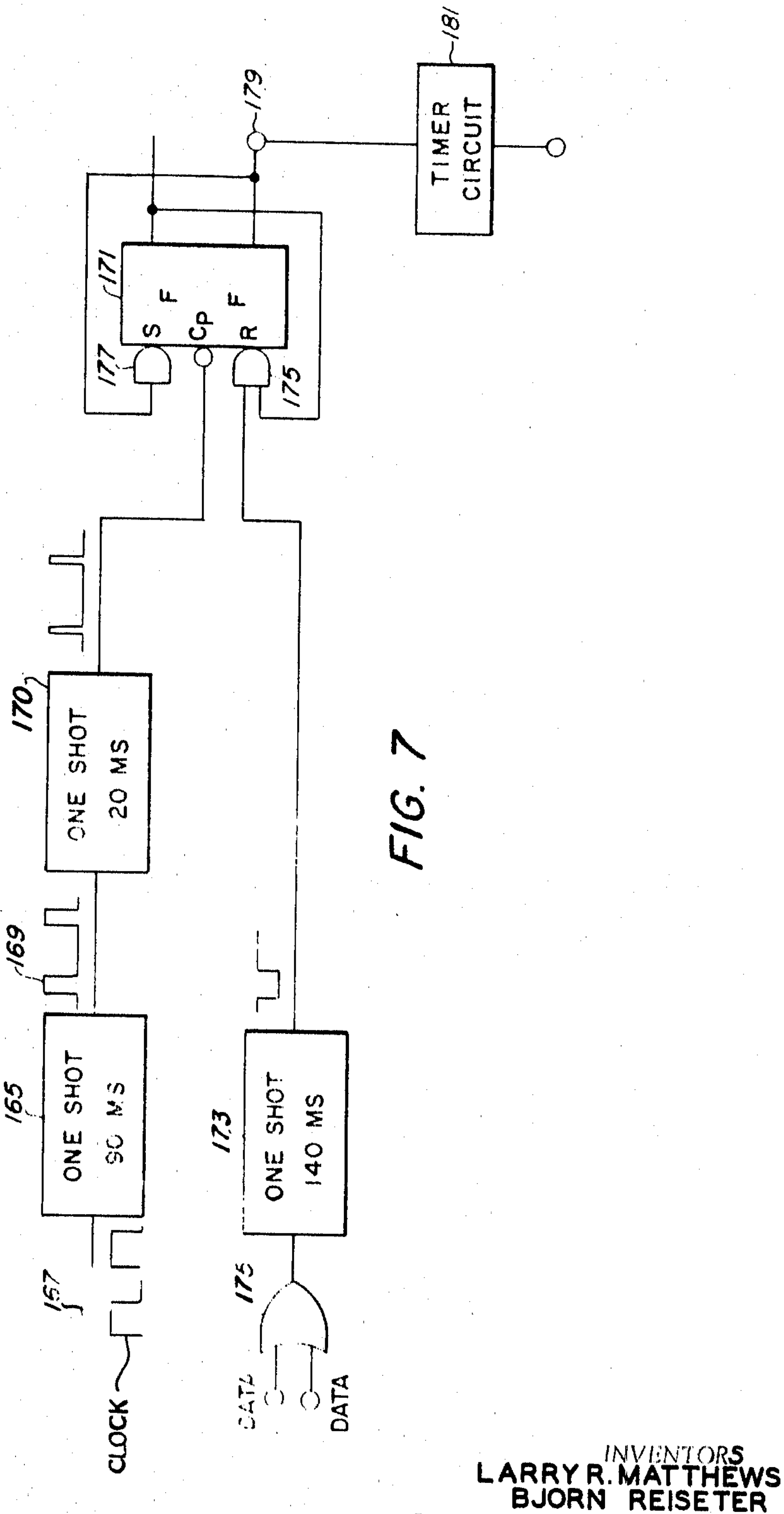
FIG. 7 is a schematic diagram of the stop tone detector utilizable in accordance with the principles of the present invention.

Referring now to FIG. 7, there is shown the preferred embodiment of the stop tone detector circuit utilizable in the interface apparatus of FIG. 3 in accordance with the principles of the present invention. Functionally, the stop tone detector is arranged to monitor the received data stream and to detect the presence of the stop tone pattern which in accordance with the preferred embodiment comprises a 2,400 baud, 1,200 hertz alternating binary "zero"-"one" pattern. As shown, the clock signal is coupled to the input of one shot 165 from terminal 167. In response to clock signals, delayed pulses of predetermined width, for example, in the order of 90 microseconds are generated at the output terminal of one shot 165 and this pulse is coupled to the input of cascaded one shot 170. In response to signals 169 from the first one shot 165, a pattern of narrow delayed pulses in the order of 20 microseconds is coupled from the output of one shot 170 to the trigger input of flip-flop 171.

The respective transitions in the received data stream and the transitions inverted are coupled to terminals of the input of one shot 173 via AND gate 175. In response to the transitions in the data stream, pulses of predetermined width are generated at the output of one shot 173. In the preferred embodiment the delay one shot 173 generates pulses in the order of 140 microseconds. These output pulses of one shot 173 are coupled as one input to a flip-flop AND gate 175 with the other input thereto, generated by the binary or logical one side of the flip-flop 171. The gate or DC level for the other gate 177 of the flip-flop 171 is generated by the logical zero side terminal of flip-flop 171.

In the normal operation of the stop tone detector, i.e., when a random video stream corresponding to the received information and background levels of the document being transferred is received, the stop tone detector flip-flop 171 toggles, i.e., continually changes state in response to received data transitions and the delayed clock transition. In response to the reception of the alternating binary "zero"-"one" binary pattern, at the 2,400 baud rate, flip-flop 171, under the control of its feedback or steering levels locks-up, thereby generating a predetermined control level at the output terminal 179. This level generated in response to the receipt and detection of the alternating stop tone pattern, is coupled to the input of a timer circuit 181 which may comprise an integrator. The integrator insures that the stop tone pattern must be detected for a predetermined time interval before the signal coupled to terminals 121, 159 and of the control logic (FIG. 4) and quantizer (FIG. 5) will reflect the detection of the legitimate stop tone.

In the foregoing there has been described novel and improved apparatus for operating a combined secure voice and in graphic communication link. As would be obvious to those skilled in the art, many modifications may be made in the disclosed method and apparatus without departing from the spirit of the present invention It is, therefore, applicant's intention to be limited only by the scope of the appended claims.

I claim:

1. In a voice-graphic communication facsimile transceiver system wherein voice and graphic information is transmitted and received, a control circuit at each transceiver in said system comprising first switch means for selectively switching said transceiver into voice and graphic operation modes respectively, second switch means for selectively switching said transceiver into transmit and receive operation modes respectively, control logic means responsive to the respective condition of said first and second switch means for selectively operating said transceiver in said selected operation modes, and means for selectively transmitting and receiving voice and graphic information in accordance with said predetermined switching functions.

2. A circuit as defined in claim 1 above further including means for injecting a stop tone signal prior to the transmission of the information in the transmit and graphic modes, means for detecting said stop tone signal from the transmitted information in the receive and graphic modes, and means responsive to said stop tone signal detection for conditioning the transceiver into the receive mode.

3. A circuit as defined in claim 2 above wherein said control logic means comprises first plurality of logic circuit means enabled in the transmit mode and disabled in the receive mode, second plurality of logic circuit means enabled in the receive mode and disabled in the transmit mode, whereby said transceiver is conditioned to operate in said predetermined operational modes.

4. A circuit as defined in claim 3 above further including quantizing means for converting said graphic information into synchronous digital signals for application by said control logic means.

5. In a graphic communication scanner and printer transceiver system wherein digital information signals are transmitted and received, control logic circuitry comprising first gating means for gating said digital information signals in response to an enabling signal in the transmit mode, said first gating means being disabled in the receive mode, second gating means for gating a reverse supervisory logic level shift in response to an enabling signal in the receive mode, said second gating means being disabled in the transmit mode, third gating means for gating a printer interlock signal in response to an enabling signal in the receive mode, said third gating means being disabled in the transmit mode, fourth gating means for gating a carrier detect signal in response to received data in the receive mode, said fourth gating means being disabled in the transmit mode, fifth gating means for gating a stop tone injection signal in response to an enabling signal in the transmit mode, said fifth gating means being disabled in the receive mode, and sixth gating means for inhibiting said stop tone injection signal in response to an enabling signal in the receive mode, said sixth gating means being disabled in the transmit mode, whereby said transceiver is selectively operated in transmit and receive modes in accordance with said enabling signals.

6. A control circuit comprising first and second input terminals, a first AND gate with its inputs coupled to said first and second input terminals, a third input terminal, a second AND gate with its inputs coupled to said third and inverted second input terminals, a first output terminal coupled to the common output from said first and second AND gates, a fourth input terminal, a third AND gate with its inputs coupled to said fourth and inverted second input terminal, a fifth input terminal, a fourth AND gate with its inputs coupled to said second and fifth input terminals, a fifth AND gate with one input coupled to the common output from said third and fourth AND gates and the other input to said third input terminal, a second output terminal coupled to the output from said fifth AND gate, a sixth AND gate with its inputs coupled to said second input terminal and the common output of said third and fourth AND gates, a seventh AND gate with its inputs coupled to the inverted common outputs from said third and fourth AND gates and the inverted input from said second input terminal, a third output terminal coupled to said inverted common output from said third and fourth AND gates, a flip-flop circuit coupled to the outputs of said sixth and seventh AND gates, means for enabling said first, fourth, and sixth AND gates in one mode, and means for enabling said second, third, fifth and seventh AND gates in the other mode, thereby logically operating on selected inputs to the input terminals in either of said selected modes.